US011351669B2

(12) United States Patent
Davis et al.

(10) Patent No.: US 11,351,669 B2
(45) Date of Patent: Jun. 7, 2022

(54) ROBOTIC MANAGEMENT FOR OPTIMIZING A NUMBER OF ROBOTS

(71) Applicant: KYNDRYL, INC., New York, NY (US)

(72) Inventors: John Robert Davis, Winchester (GB); Clea Anne Zolotow, Key West, FL (US)

(73) Assignee: Kyndryl, Inc., New York, NY (US)

( * ) Notice: Subject to any disclaimer, the term of this patent is extended or adjusted under 35 U.S.C. 154(b) by 332 days.

(21) Appl. No.: 16/666,489

(22) Filed: Oct. 29, 2019

(65) Prior Publication Data
US 2021/0122032 A1    Apr. 29, 2021

(51) Int. Cl.
B25J 9/00         (2006.01)
B25J 9/16         (2006.01)
G05B 13/02        (2006.01)

(52) U.S. Cl.
CPC ............ B25J 9/0084 (2013.01); B25J 9/163 (2013.01); G05B 13/0265 (2013.01)

(58) Field of Classification Search
CPC ........ G06Q 10/06315; G05B 19/41865; G05B 2219/39167; G05B 13/0265; Y02P 90/02; B25J 9/0084; B25J 9/163; G06F 9/4862; G06F 9/505
USPC ................................................. 700/245–264
See application file for complete search history.

(56) References Cited

U.S. PATENT DOCUMENTS 5,297,260 A * 3/1994 Kametani ............. G06F 15/167
                                                    257/E21.705
5,396,598 A * 3/1995 Andersen .................. G06F 3/05
                                                    702/14
5,867,649 A * 2/1999 Larson ..................... G06F 8/314
                                                    709/201
(Continued)

FOREIGN PATENT DOCUMENTS

EP          3185124 A1      6/2017

OTHER PUBLICATIONS

G. Beccari et al, "Rate modulation of soft real-time tasks in autonomous robot control systems, 1999, IEEE," Proceedings of 11th Euromicro Conference on Real-Time Systems. Euromicro RTS'99, 1999, pp. 21-28, doi: 10.1109/EMRTS.1999.777446. (Year: 1999).*

(Continued)

Primary Examiner — Jaime Figueroa
(74) Attorney, Agent, or Firm — Schmeiser, Olsen & Watts, LLP; Ken Han

(57) ABSTRACT

A method, computer system, and computer program product for optimizing a number of robots for operation of a process at a target system. The method may include providing a plurality of available robots to carry out tasks in the process at the target system. The method may monitor the target system by carrying out the process or part of the process with a varying number of robots to determine the processor utilization whilst the robots are executing a varying number of tasks. The method may balance process constraints of the execution of the process with physical system constraints of the target system by measuring a relationship between a number of tasks at a transactional level and the processor utilization. The method may output the optimized number of robots to be allocated for the process or part of the process.

20 Claims, 8 Drawing Sheets

(56) References Cited

U.S. PATENT DOCUMENTS

| | | | | |
|---|---|---|---|---|
| 6,115,646 | A * | 9/2000 | Fiszman | G06F 9/465 |
| | | | | 700/86 |
| 7,089,511 | B2 * | 8/2006 | Allen | G06F 30/39 |
| | | | | 716/103 |
| 8,108,512 | B2 * | 1/2012 | Howard | G06F 9/5072 |
| | | | | 709/224 |
| 8,782,120 | B2 * | 7/2014 | Jackson | H04L 67/1002 |
| | | | | 709/202 |
| 8,825,183 | B2 * | 9/2014 | Hammack | G05B 19/409 |
| | | | | 700/17 |
| 9,008,840 | B1 * | 4/2015 | Ponulak | B25J 9/161 |
| | | | | 700/250 |
| 9,547,302 | B2 * | 1/2017 | Landgraf | G05B 19/4155 |
| 9,756,151 | B2 * | 9/2017 | Goel | G06F 9/505 |
| 10,235,642 | B2 * | 3/2019 | Kattepur | G05B 19/41895 |
| 10,788,836 | B2 * | 9/2020 | Ebrahimi Afrouzi | |
| | | | | G05D 1/0212 |
| 11,120,368 | B2 * | 9/2021 | Varadarajan | G06N 20/00 |
| 2004/0006584 | A1 * | 1/2004 | Vandeweerd | G06F 30/33 |
| | | | | 718/107 |
| 2005/0132320 | A1 * | 6/2005 | Allen | G06F 30/39 |
| | | | | 716/103 |
| 2007/0244599 | A1 * | 10/2007 | Tsai | B25J 9/1602 |
| | | | | 700/245 |
| 2008/0052554 | A1 * | 2/2008 | Landgraf | G05B 19/4155 |
| | | | | 713/500 |
| 2008/0082933 | A1 * | 4/2008 | Howard | G06F 9/5072 |
| | | | | 715/771 |
| 2009/0077483 | A9 * | 3/2009 | Howard | G06F 9/5072 |
| | | | | 715/771 |
| 2014/0152103 | A1 | 6/2014 | Schauer | |
| 2014/0214183 | A1 * | 7/2014 | Mast | G05B 23/0235 |
| | | | | 700/32 |
| 2015/0256401 | A1 * | 9/2015 | Zinger | H04L 41/14 |
| | | | | 370/401 |
| 2016/0294665 | A1 * | 10/2016 | Fowler | H04L 43/16 |
| 2017/0305015 | A1 | 10/2017 | Krasny | |
| 2018/0189093 | A1 * | 7/2018 | Agarwal | G06F 9/45558 |
| 2019/0041944 | A1 * | 2/2019 | Abu Salah | G06F 1/3296 |
| 2019/0049975 | A1 * | 2/2019 | Kattepur | G06Q 10/087 |
| 2020/0225673 | A1 * | 7/2020 | Ebrahimi Afrouzi | |
| | | | | G05D 1/0214 |

OTHER PUBLICATIONS

Chavez et al, "Challenger : A multiagent system for distributed resource allocation", 1997, ACM, journal "Proceedings 1st International Conference on Autonomous Agents, Marina Del Rey, California USA 1997", pp. 323-331. (Year: 1997).*

Das, "An Introduction to Operations Management", The Joy of Operations, 1st Edition, Accessed on Sep. 6, 2019, 3 pages.

EY, "Risk and control considerations within robotic process automation implementations", Balancing transformation with risk and control to achieve compliance, EY Building a better working world, 12 pages, © 2018 EYGM Limited.

Hill et al., "Amdahl's Law in the Multicore Era", IEEE Computer, Jul. 2008, 6 pages.

https://activeops.com/us/workware/, "Workware", Accessed on Sep. 3, 2019, Workware from ActiveOps—Digital Operations Management, 8 pages.

https://www.quora.com/What-is-the-mathematical-characterization-of-a-"knee"-in-a-curve, , "What is the mathematical characterization of a "knee" in a curve?", 2017, 3 pages.

Korhonen, "Robotic Process Automation", "If you can teach it, you can automate it", FUJITSU shaping tomorrow with you, http://www.fujitsu.com/fi/Images/Robotic%20Process%20Automization.pdf, 15 pages, Copyright 2016 FUJITSU.

Mell et al., "The NIST Definition of Cloud Computing", Recommendations of the National Institute of Standards and Technology, Special Publication 800-145, Sep. 2011, 7 pages.

Muralithar, "RPA Journey Best Practices: How to load processes on robots?", https://www.linkedin.com/pulse/rpa-journey-best-practices-how-load-processes-robots-muralithar/, Accessed on Sep. 3, 2019, 7 pages.

* cited by examiner

ROBOTIC MANAGEMENT FOR OPTIMIZING A NUMBER OF ROBOTS

BACKGROUND

Embodiments of the present invention relate generally to a method, system and computer program for robot number optimization, and more particularly, to optimizing a number of robots for operation of a process at a system.

Robots are increasingly being used to automate repetitive processes that are currently done by humans. Robotic Process Automation (RPA) technologies are used to automate tasks using legacy systems that were previously performed by humans.

BRIEF SUMMARY

According to an embodiment of the present invention there is provided a computer-implemented method for optimizing a number of robots for operation of a process at a target system, comprising: providing a plurality of available robots to carry out tasks in the process at the target system, wherein the target system includes one or more processors having a processor utilization. The method may include monitoring the target system by carrying out the process or part of the process with a varying number of robots to determine the processor utilization whilst the robots are executing a varying number of tasks. The method may include balancing process constraints of the execution of the process with physical system constraints of the target system including available physical robot interfaces by measuring a relationship between a number of tasks at a transactional level and the processor utilization to optimize a number of robots for the process or part of the process at the target system. The method may also include outputting the optimized number of robots to be allocated for the process or part of the process.

According to another embodiment of the present invention there is provided a system for optimizing a number of robots for operation of a process at a target system, the system comprising: a computer system comprising, a processor, a computer readable storage medium, and program instructions stored on the computer readable storage medium being executable by the processor to cause the computer system to: provide a plurality of available robots to carry out tasks in the process at a target system, wherein the target system includes one or more processors having a processor utilization. The system may monitor the target system by carrying out the process or part of the process with a varying number of robots to determine the processor utilization whilst the robots are executing a varying number of tasks. The system may balance process constraints of the execution of the process with physical system constraints of the target system including available physical robot interfaces by measuring a relationship between a number of tasks at a transactional level and the processor utilization to optimize a number of robots for the process or part of the process at the target system. The system may also output the optimized number of robots to be allocated for the process or part of the process.

According to another embodiment of the present invention there is provided a computer program product for optimizing a number of robots for operation of a process at a target system, the computer program product comprising a computer readable storage medium having program instructions embodied therewith, the program instructions executable by a processor to cause the processor to: provide a plurality of available robots to carry out tasks in the process at the target system, wherein the target system includes one or more processors having a processor utilization; monitor the target system by carrying out the process or part of the process with a varying number of robots to determine the processor utilization whilst the robots are executing a varying number of tasks; balance process constraints of the execution of the process with physical system constraints of the target system including available physical robot interfaces by measuring a relationship between a number of tasks at a transactional level and the processor utilization to optimize a number of robots for the process or part of the process at the target system; and output the optimized number of robots to be allocated for the process or part of the process.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
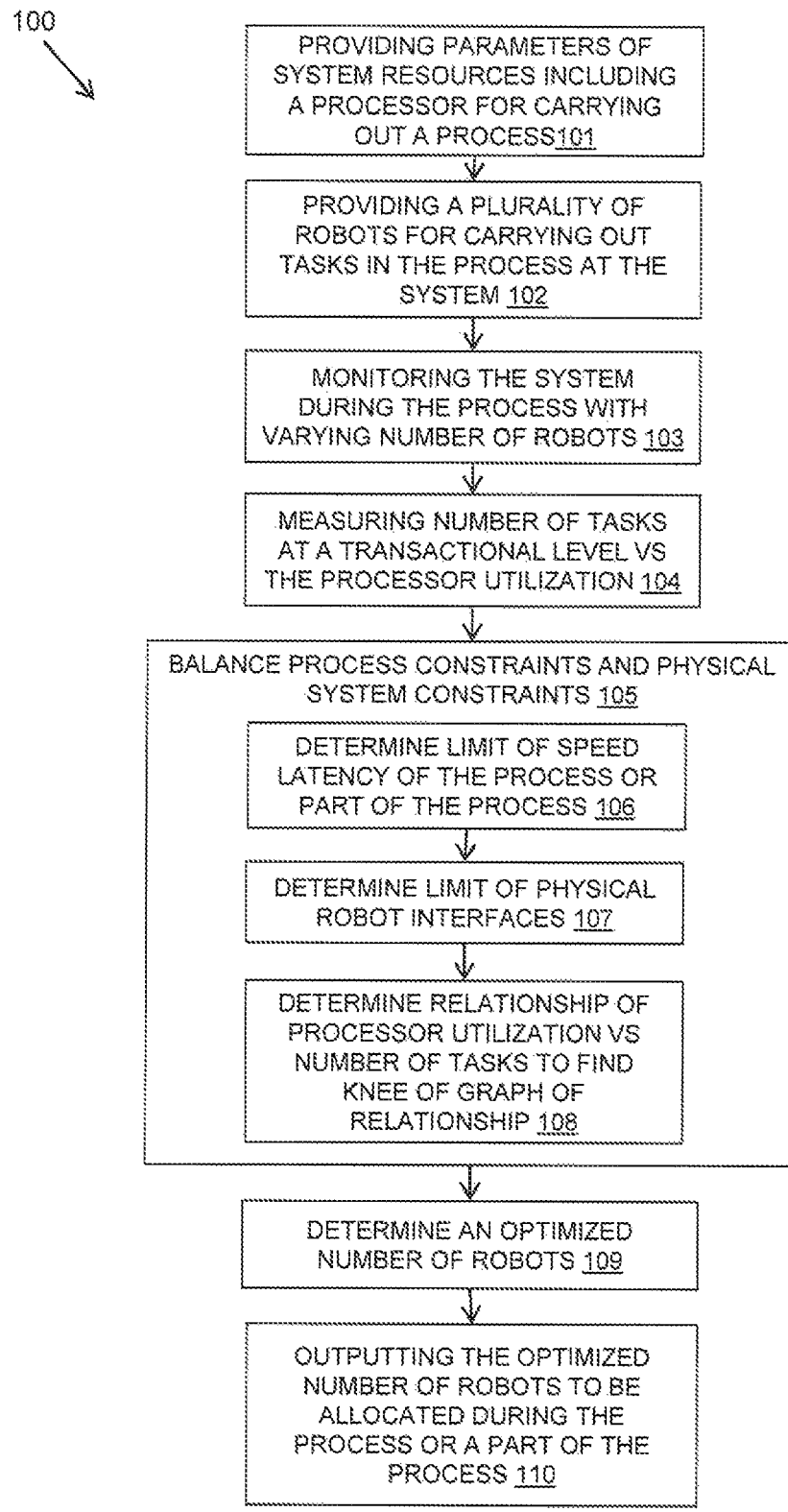
FIG. 1 is block diagram of an example system in which the present invention may be implemented.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for optimizing a number of robots carrying out tasks as part of a process at a system. Robots are easy to scale, unlike human resources. RPA technologies tend to work against a queue centered architecture, whereby robots working on a single use case take work items from a queue and process them. The more robots that are applied, the quicker the queue is resolved.

However, system constraints may put a limit on the scalability of the robots, particularly when the robots are carrying out tasks at a legacy or classic system. Legacy systems may be systems that have not been developed with robots in mind but have robotics applied in retrospect to carry out tasks. Legacy systems generally include established and inflexible system resources.

As there are constraints when dealing with a legacy system, the legacy system may not scale to match the number of robots able to be deployed. For example, a printer management application may view the status of 300 printers in a portal. To be pre-emptive with the printer management, 2-3 staff may be employed looking for paper jams or consumable shortages by repeatedly surveying all 300 printers in the portal.

Alternatively, Robotic Process Automation (RPA) robots may be deployed to perform the same task, checking each of the 300 printers in turn. The robot has to work at the speed of the legacy graphical user interface (GUI), so a single robot going in and out of 300 prints (at 50 seconds per printer) would take too long to process the entire queue (approximately 4 hours). The robots can be scaled and have three robots processing the queue cutting the processing time, the cycle time now being cut to a third (just over 1 hour). If processing time was a core metric then this might motivate an increase to the number of robots further to 10, with the prospect of checking all printers in just 25 minutes. However, the result of this action could mean that the printer management application performance begins to degrade. It is not designed for 10 simultaneous connections all working faster than humans manipulating the GUI. Thus, leading to processing degradation at best or system failure at worst.

Embodiments of the present invention provide a solution to the problem of process degradation or system failure that may occur when scaling robots, especially when using legacy systems to which RPA technologies have been applied to implement a number of robots to carry out tasks that might have been previously carried out by humans. Alternatively, the system may be a system designed for robots for which optimization is required during development.

Embodiments of the present invention may automatically determine the optimal number of robots that are needed for a particular task, ensuring end-to-end peak transactional performance while eliminating the need to manually control and change the robots. Embodiments of the present invention may balance the non-functional capabilities of the legacy system with the amount of robotic processing that is applied against it. The process being carried out at the system may be one or more applications, services involving multiple tasks. The process may be formed of a combination of multiple individual processes.

Reference will now be made in detail to the embodiments of the present invention, examples of which are illustrated in the accompanying drawings, wherein like reference numerals refer to like elements throughout.

Referring to FIG. 1, a flow diagram 100 shows an example embodiment of the described method in which an optimized number of robots are allocated for operation of a process involving multiple tasks at a system. In one example, the system may be a legacy system in which the system resources are invariable due to established physical constraints. The process may be an ongoing process or a finite process and the allocation may be determined by a testing period and/or during ongoing operation of the process.

Referring to operation 101, a robot system may provide parameters of the system resources including one or more processors having a known performance capacity or maximum processor utilization. The system resources may also include resources that restrict a number of robots that are capable of interacting with the system at a time, for example, a number of robot interfaces such as available ports or other interfaces.

Referring to operation 102, the robot system may provide a plurality of available robots to carry out the tasks of the process at the system. There may be a maximum number of available robots, which may limit the optimization.

Referring to operation 103, the robot system may monitor the system whilst carrying out the process to determine the processor utilization whilst executing a varying number of tasks. This may be done by adding a robot or a fraction of a robot to increase the number of tasks whilst measuring the processor utilization. The number of tasks may be determined at a transactional level if different tasks are being carried out.

Monitoring the system may be carried out over a training time period and may include learning optimized numbers of robots for the system carrying out the process under known conditions or at a known point in the process.

Monitoring the system may be carried out during execution of the process to determine total utilization of the processor whilst the robots are executing the tasks including processing carried out for interactions in addition to the robots. This may enable an optimized number of robots to the allocated on the fly during execution of the process, for example, by testing over 15-minute intervals to continuously optimize a number of robots.

Referring to operation 104, the robot system, during its monitoring of the system, may include measuring a relationship between a number of tasks at a transactional level and the processor utilization.

Referring to operation 105, the robot system may balance process constraints, including a speed latency of the process or part of the process, with physical system constraints, including a number of robot interfaces and/or processor utilization, to optimize a number of robots for the process. The balancing is carried out using the measured relationship between a number of tasks at a transactional level and the processor utilization, which is used to determine both the physical system constraints and the process constraints.

In one example, this may balance a speed latency of the execution of the process with a knee of the curve of a measured relationship between a number of tasks and the processor utilization that indicates an optimum use of the processor. The balancing may also include taking into consideration the physical constraints of robot interfaces that may also vary during the process.

Referring to operation 105, in order to balance the process constraints and the physical system constraints, the robot system may determine, at operation 106, a speed latency of the execution of the process or part of the process as a process constraint. The speed latency may be defined as a minimum execution time of the process regardless of a number of robots applied. For example, the speed latency may determine an average queuing for a task in the process. The speed latency may be robot and process dependent and may require training. Amdahl's law may be applied as described further below.

In order to balance the process constraints and the physical system constraints, the robot system may determine, at operation 107, a limit of physical robot interfaces as a physical system constraint. This may be fixed for the process or may vary during the execution of the process, for example, there may be a batch cycle that intermittently decreases the number of slots available for the robots.

In order to balance the process constraints and the physical system constraints, the robot system may determine, at operation 108, a knee of the curve of the measured relationship between processor utilization and a number of tasks at a transactional level as another form of physical system constraint. The knee of the curve indicates that a point has been reached where processor utilization starts to increase and number of transactions will go down, which indicates that the processor has reached a limit of transactions and therefore of robot number. The knee of a curve is where the curvature has a local maximum indicating that the utilization of the processor is optimal to provide a number of tasks at a transactional level.

The balancing between the determined process constraints and physical system constraints may take different forms to determine, at operation 109, an optimized number of robots. The robot system may carry out the balancing at intervals during the execution of the process and may learn the determined parameters of a given situation for future reference and use.

In one example, the balancing may use a limit of a number of robots determined by the speed latency within which a number of robots may be varied to meet the physical system constraints.

Referring to operation 110, the robot system may output an optimized number of robots to be allocated for the process or for part of the process. The optimized number of robots for the process may dynamically vary during the execution of the process.

Robots may be full robots or may be fractions of robots, for example, where the speed of operation of a robot is throttled back. This may be relevant if the addition of a whole robot may have a significant impact and a fraction of a robot is needed to fill the available performance envelope. The optimized number of robots may therefore include a non-integer number of robots for a partial allocation of a robot.

Figure 2:
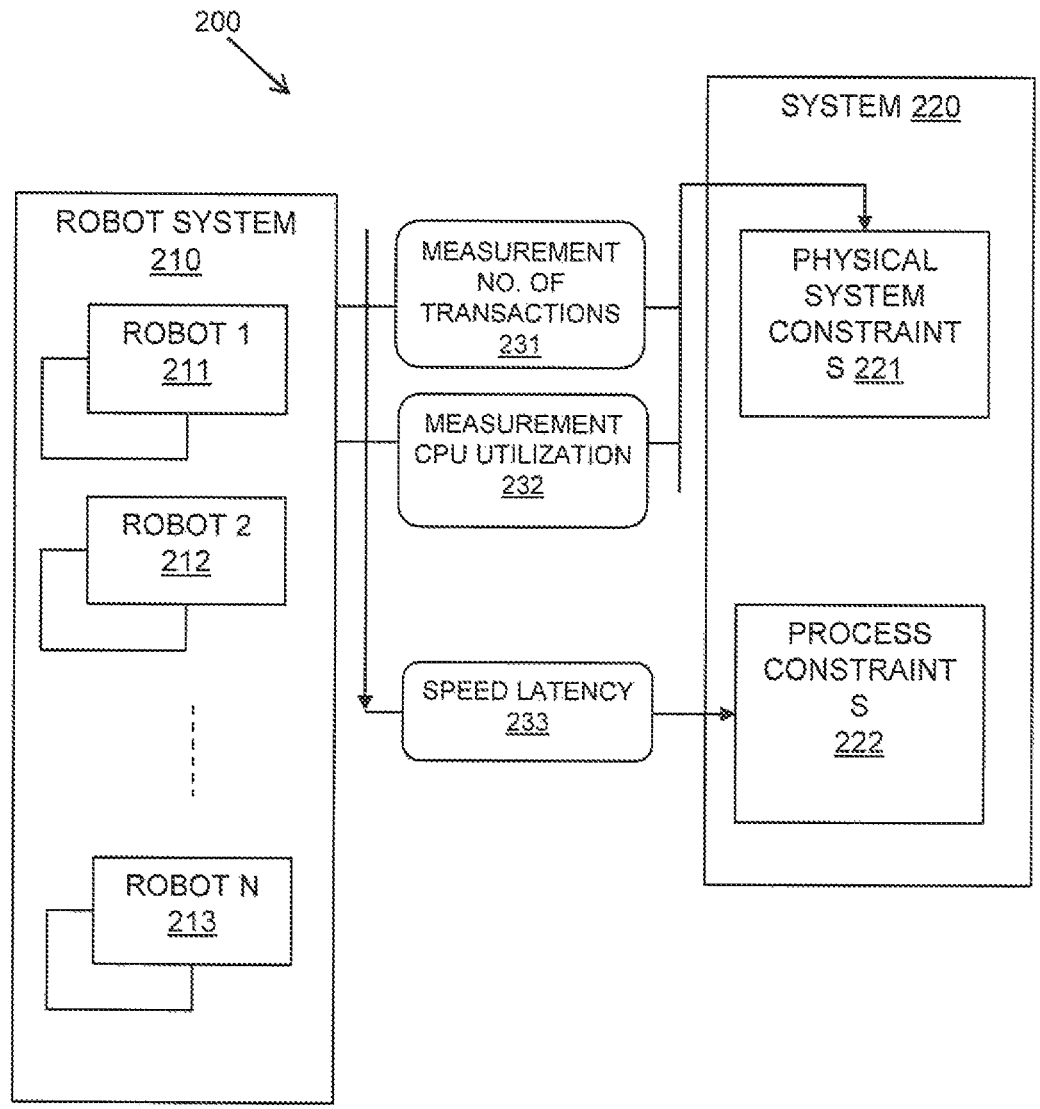
FIG. 2 is block diagram of an example system showing measure parameters in accordance with the present invention.

Referring to FIG. 2, a schematic block diagram 200 illustrates the measurements used in the described method. The figure shows a robot system 210 including multiple robots 211-213. Each robot may be made up of sub-units for partial use of the robot. The robot system 210 may be applied to a system 220 that has physical system constraints 221 such as robot interfaces and processor capacity, and process constraints 222 such as process speed latency.

The figure illustrates that a measurement of a number of transactions 231 and a measurement of CPU (Central Processing Unit) utilization 232 may be utilized to measure the knee of the curve to ascertain physical system constraints 221 and also to ascertain the speed latency 233 of the process constraints 222.

Physical System Interaction and Constraints

For legacy systems handling robots, the system will usually not be infinitely scalable. Therefore, adding additional robots will not cause a limitless increase in productivity due to physical system constraints.

For example, if two robots are deployed in an example system, the system may become 100% faster. If four robots are deployed, the system may become 200% faster. However, if eight robots are deployed, the system may either stay at 200% faster, degrade, or may break as the system cannot handle over four concurrent robots.

One form of physical system constraint may be a number of robot interfaces or slots provided by the system. The number of slots may also be variable (for example, for a particular application) and subject to stresses than robots. For example, a legacy application may have a batch cycle that intermittently decreases the number of slots available for the robotic task execution. Also, humans may also be simultaneously using the system in parallel with the robots.

The described method determines the number of tasks being executed at the transactional level as well as the CPU utilization, knowing that if the CPU utilization goes up and the number of transactions goes down, then the system has hit a "knee of the curve" condition. The system may be continuously tested, for example, accumulated over 15 minute intervals with robots added, deleted, or quiesced according to the calculation.

Figure 3A:
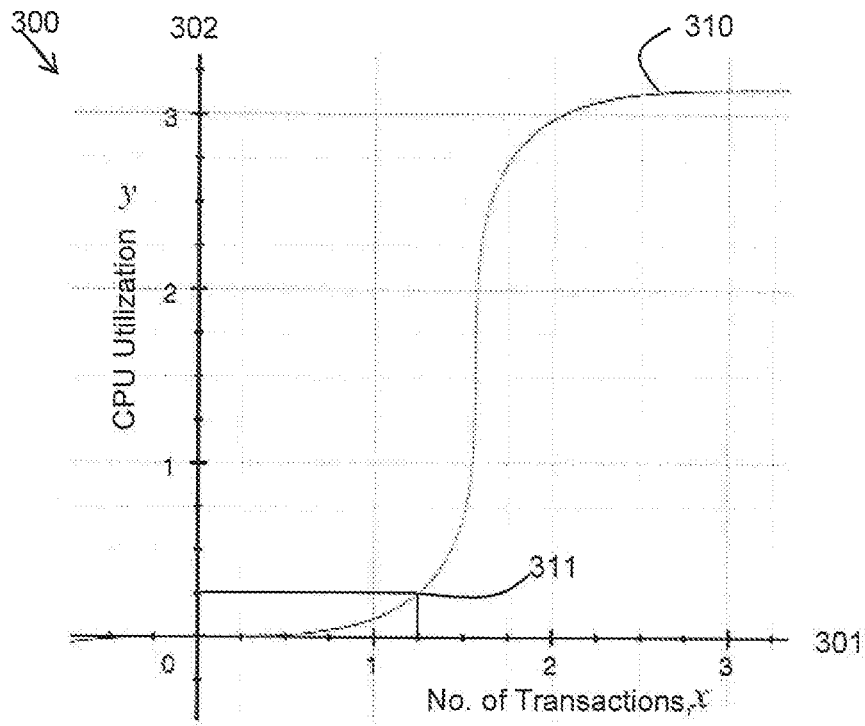
FIGS. 3A and 3B are schematic diagrams illustrating knee of a curve calculations as used in the described method.

In order to determine the knee of the curve, a graphical interaction or algorithm is created of the number of transaction vs CPU time as shown in FIG. 3A.

FIG. 3A shows a graph 300 of a number of transactions 301 against a CPU utilization 302. The number of transactions may be a number of tasks at a transactional level to accommodate different tasks.

The graph 310 may take the form: $x-y=\sin(x+y)$, where $x>0$

The curvature is near 0 for x between −0.5 and +0.5 with an inflection point at x=0. As x increases from +0.5 to about 1.25 the curvature increases, then decreases after that, so there is a knee of the curve 311 about the point (1.25, 0.25).

Figure 3B:
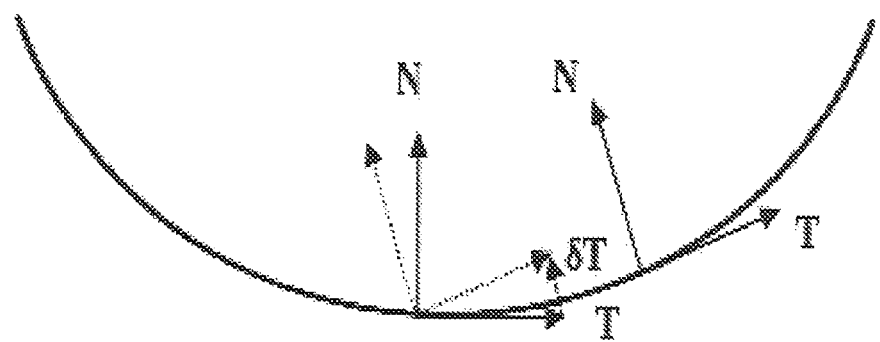

There are many ways to calculate out the knee of the curve. Another form is a calculus method illustrated in FIG. 3B. This shows vectors T and N at two points on a plane curve, a translated version of the second frame (dotted), and the change in T: $\delta T.\delta s$ is the distance between the points. In the limit $dT/ds$ will be in the direction N and the curvature describes the speed of rotation of the frame.

Here δ will be compared between T1, T2, T3 for a start to an exponential CPU time usually accompanied by a drop in transactional completion or even timeouts. At this time robots should be taken out of service to the legacy system. Conversely, a flat δ will induce more robots until the optimal (fluctuating) point is ascertained and executed. Note that in the above mathematics, it is assumed that the legacy system as a whole is behaving as a serial bottleneck, even though it has multiple slots. The point at which the δ is determined to be at peak is usually an exponential rise.

Process Constraints

In addition, to the physical system constraints there are also constraints due to the process being carried out at the system.

Amdahl's Law states that if one enhances a fraction f of a computation by a speedup S, then the overall speedup is:

$$S_{latency}(s) = \frac{1}{(1-p) + \frac{p}{s}}$$

where: $S_{latency}$ is the theoretical speedup of the execution of the whole task; s is the speedup of the part of the task that benefits from improved system resources; and p is the proportion of execution time that the part benefiting from improved resources originally occupied.

The entire process is used computationally (i.e., how long does it take in total for all printers to be scanned and updated). s here is the speedup by the additional robot. p is the proportion of execution time that is supplied by the additional robot.

The theoretical speed up of the execution of a process increases with the improvement of the resources provided by additional robots but is limited by the duration of a part of the process that cannot benefit from the improvement. For example, a part of the process that does not benefit from additional robots may be a fixed processing that is required for execution or an average queuing time for a task in the process.

This is can also be thought of as the law of diminishing returns. This may be carried out by testing the addition of the theoretical speedup by an additional robot, and measuring the number of transactions or tasks done by the robot during the CPU time. Then $S_{latency}$ is calculated. As $S_{latency}$ approaches 0 then it is clear where the diminishing return will be. Note that this is robot and process dependent and will require training.

Combination of Physical System Constraints and Process Constraints

A number of robots at an optimal point of the knee of the curve δ is balanced with a number of robots where $S_{latency}$ approaches 0 to determine the diminishing return to optimize a number of robots in the system.

A learning mechanism may be used so that the optimal point of the knee of the curve δ and $S_{latency}$ approaching 0 to determine the diminishing return do not need recalculation within a legacy system. This can be created in a standard database and be refreshed on a continual basis based on either process changes or system changes.

If the learning mechanism is invoked, the optimal point does not need recalculation (i.e., if the optimal point is four robots then, if the system does not change, it does not need to be recalibrated). If the optimal point is kept in a database, it can be reused without recalculating it every time. This may also be kept on a schedule to see if there are changes in the system that would push a recalculation, for example, on a weekly basis.

Figure 4:
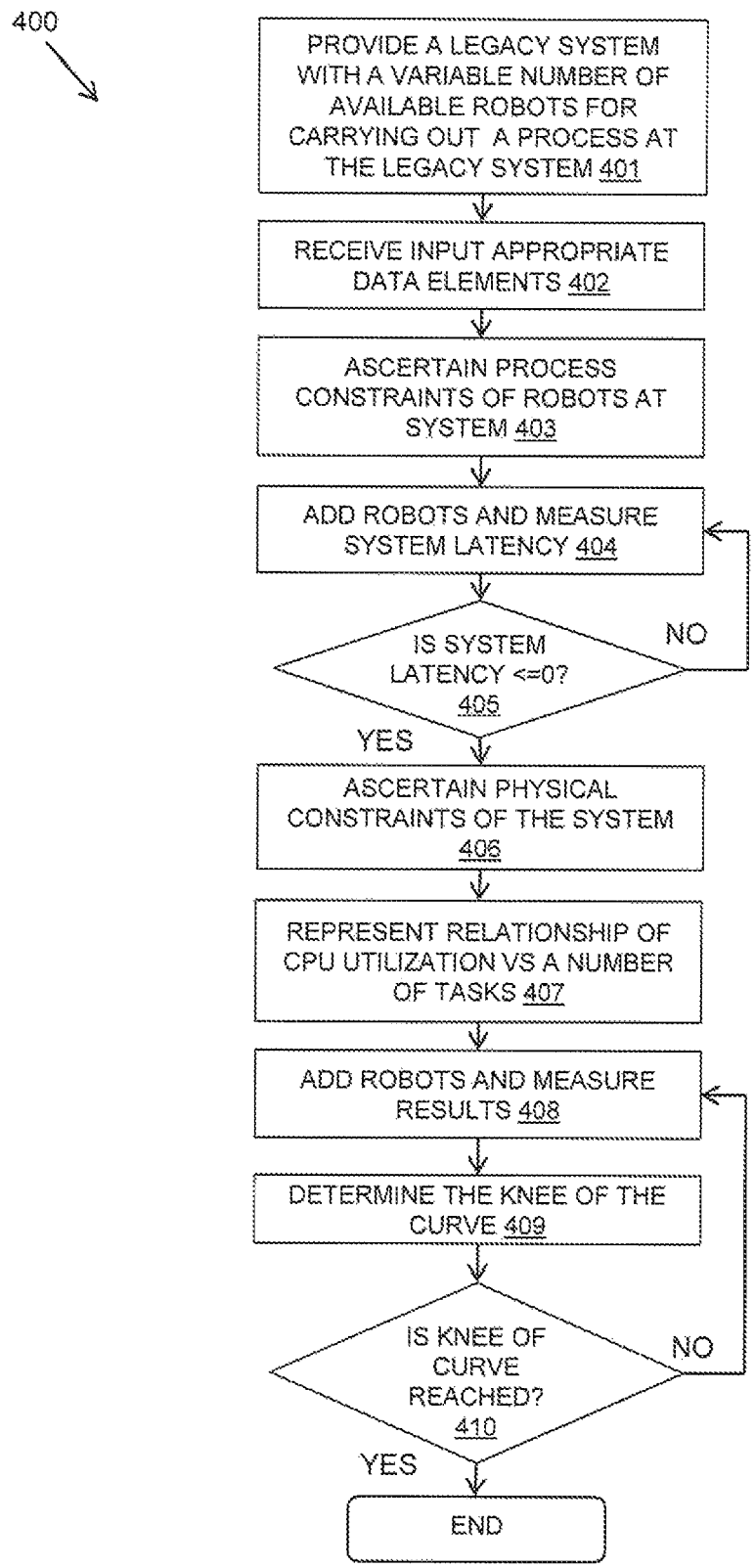
FIG. 4 is a flow diagram of a more detailed example embodiment of a method in accordance with the present invention.

Referring to FIG. 4, a flow diagram 400 shows an example embodiment of the described method.

Referring to operation 401, the robot system 210 may provide a legacy system with a variable number of available robots for carrying out a process at the legacy system. The robot system 210 may receive inputs, at operation 402, of appropriate data elements including: a number of robots, a number of tasks in the process, a CPU utilization per task, a CPU total utilization, and time.

Referring to operation 403, the robot system 210 may ascertain process constraints using Amdhal's law to measure speed latency of the process. The robot system 210 may add, at operation 404, robots and measure the system latency to determine, at operation 405, if the $S_{latency}(s) <= 0$. If the speed latency has not reached $S_{latency}(s) <= 0$, the method may add another robot until $S_{latency}(s) <= 0$.

Referring to operation 406, the robot system 210 may ascertain physical constraints of the system by representing, at operation 407, a relationship of CPU utilization against a number of tasks at a transactional level. The robot system 210 may add robots, at operation 408, from a number lower than the number ascertained for the speed latency limit.

Referring to operation 409, the robot system 210 may determine a knee of the curve. The robot system 210 may measure the results, at operation 410, until a knee of the curve is reached for, x−y=sin(x+y) and x=transactions and y=CPU utilization. If the knee curve is reached, the robot system 210 ends the process. If the knee curve is not reached, the robot system 210 goes back to operation 408 to add robots and measure the results.

The described method and system consider both the robot scalability and the impact on the workload as well as the processes or applications utilized by the robot.

Robot attributes mean that traditional user-based performance monitoring is inadequate and the full potential of automated delivery cannot be realised. Robots are applied to tasks manually taking worse case available production performance into account. This method allows dynamic allocation aiming to use fully a legacy system's available performance envelope.

Robots have different attributes to humans, relevant attributes include: the ability to work 24/7/365 without breaks; the ability to be applied to a task or removed from a task instantly; the ability to work faster than a human in terms of system interaction; the ability to work seamlessly in a team spreading workload exactly evenly and all working at the same pace; the ability for this team to be scaled massively, instantly, should it be needed (for example, 1000's of robots work the same task). The dynamics of these attributes mean that robots may cause performance issues on legacy systems more quickly as robots will not pull back on their activities and stop unless there is a feedback solution to regulate their behaviour. The dynamics of these attributes also mean that robots can drive a legacy system to the limit of its performance capabilities, but unless successfully managed, then easily take the system beyond those limits leading to performance degradation.

For some use cases it is optimal to push for the maximum possible throughput that the system will allow at any point in time. The system may be under load for many unrelated tasks, batch operations, human user interactions, but this load is unlikely to be uniformly distributed, so when there is spare capacity this method allows a rapid expansion of load with robots executing tasks to fill the available envelope whilst not degrading the legacy system.

The potential of the method is to micro manage the assignment and removal of robots to completely and dynamically fill the available capacity on the environment. This can be applied to not only full robots, but also to throttle back the speed of operation of a single robot, creating fractions of robots. This will become relevant as individual robot performance increases to the point where the addition of whole robots could have a significant impact on some systems, so to fill that available performance envelope a degraded or fraction of a robot is needed.

Robots no longer need to be manually controlled and changed. The system may determine the optimal number of robots, which can change during the time period. The system not only includes robotic sensors for physical performance and capacity monitoring, but also includes end-to-end monitoring with legacy systems being impacted.

This is impactful for applications upgrades. Robotic sizing may take application upgrades in stride, so the system does not need to be rebalanced.

Guarding against system degradation while maximizing the performance of automation against legacy systems is of importance, especially if the systems are business critical such as core banking or customer relationship management, the failure of which would result in significant business impact.

The robot optimization probes a legacy system for the key performance indicators of the system for memory, computes the transaction processing potential pipeline of required virtual robot slots and available virtual robot slots from the Key Performance Indicators (KPI) of the legacy system, and dynamically keeps the legacy systems as occupied as possible and at optimum performance level.

Figure 5:
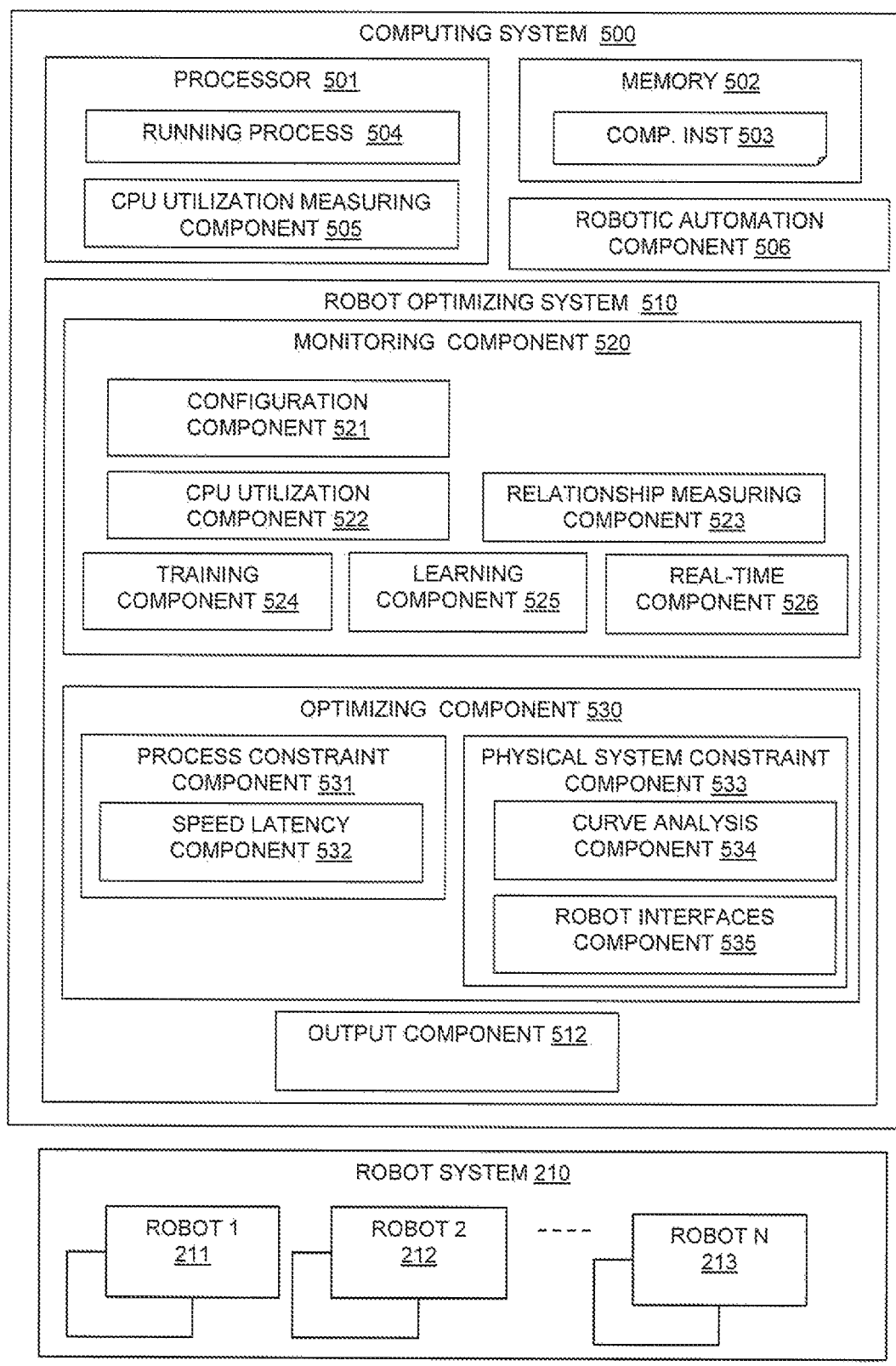
FIG. 5 is block diagram of an example embodiment of a system in accordance with the present invention.

Referring to FIG. 5, a block diagram shows a computing system 500 in which the described robot optimization system 510 may be implemented. The computing system 500 may be a target system such as a legacy system for which a number of robots is being optimized. Alternatively, the robot optimization system 510 may be provided remotely to the target system, for example, as a cloud service. A robot system 210 may provide a plurality of robots 211-213 that are controlled by a robotic automation component 506 to carry out tasks in a running process 504 at a target system.

The computing system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components. The computing system 500 may also include a CPU utilization measuring component 505.

The robot optimizing system 510 may include a monitoring component 520 for monitoring the target system including a configuration component 521 for carrying out the process or part of the process with a varying number of robots to determine utilization of the processor whilst the robots are executing a varying number of tasks. The monitoring component 520 include a CPU utilization component 522 for monitoring the CPU utilization and a relationship measuring component 523 for measuring a relationship between a number of tasks at a transactional level and the processor utilization.

The monitoring component 520 may include a training component 524 for monitoring the target system for a training period and a learning component 525 for learning an optimized number of robots for the target system under known conditions. The monitoring component 520 may also include a real-time component 526 for monitoring the target system during execution of the process to determine total utilization of the processor whilst the robots are executing the tasks including processing carried out for interactions in addition to the robots and updating the optimized number of robots during execution of the process.

The robot optimizing system 510 may include an optimizing component 530 for balancing process constraints of the execution of the process with physical system constraints to optimize a number of robots for the process at the target system.

The optimizing component 530 may include a process constraint component 531 including a speed latency component 532. The speed latency component 532 may determine a speed latency from the relationship between a number of tasks at a transactional level and the processor utilization, where speed latency is limited by a duration of a part of the process that is not reduced by additional robots.

The optimizing component 530 may include a physical system constraint component 533 including a curve analysis component 534 for determining a knee of a curve of the measured relationship between the number of tasks at a transactional level and the processor utilization to determine a point at which an optimal number of tasks is reached for the processor utilization and a robot interfaces component 535 for determining available physical robot interfaces of the target system that are variable during execution of the process.

The robot optimizing system 510 may include an output component 512 for outputting the optimized number of robots to be allocated for the process or part of the process.

Figure 6:
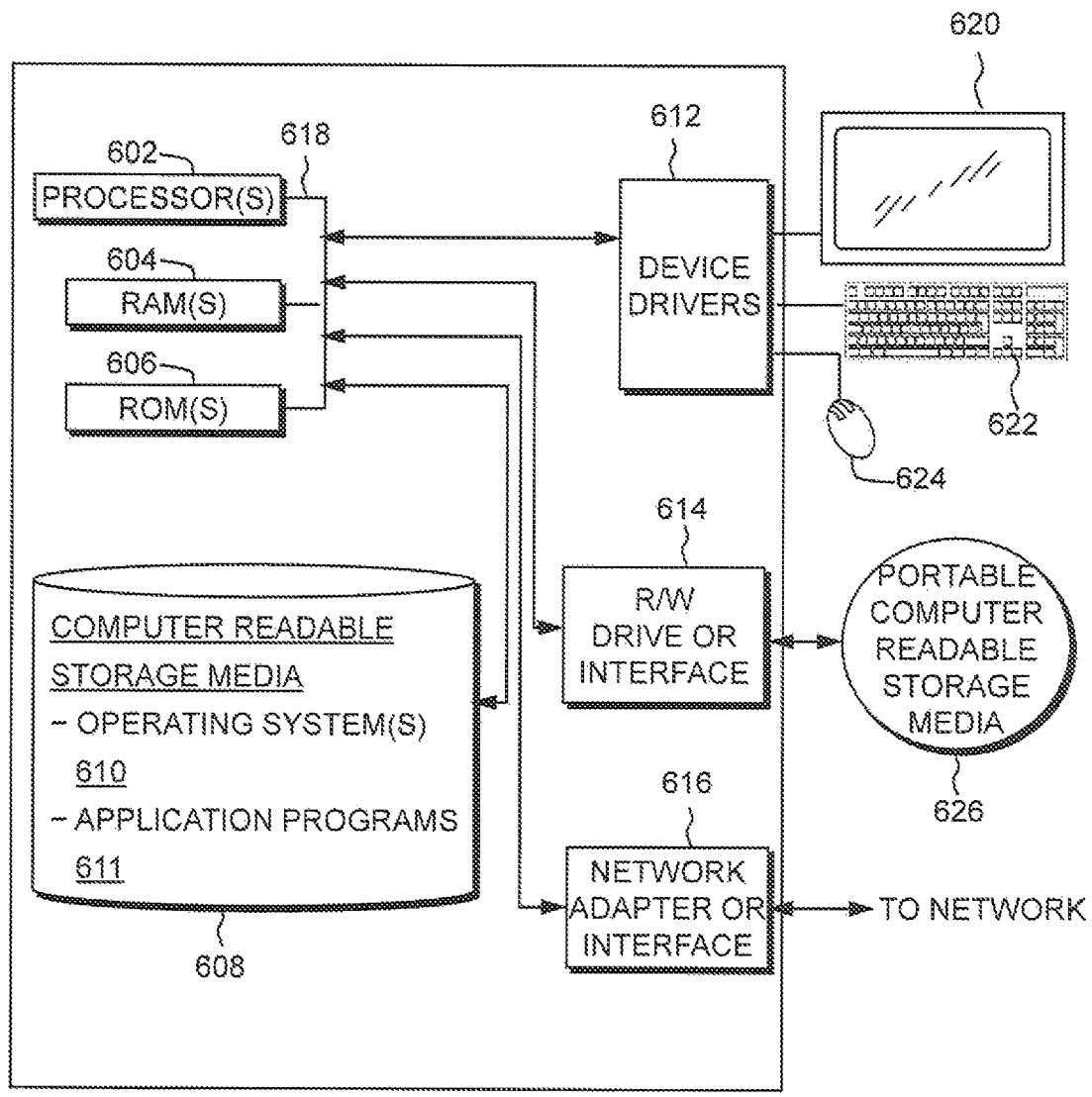
FIG. 6 is a block diagram of an embodiment of a computer system or cloud server in which the present invention may be implemented.

FIG. 6 depicts a block diagram of components of the computing system 500 of FIG. 5, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing system 500 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as [benchmark analysis system 140, transaction processing system 120, and database management system 130] are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 500 can also include a R/W drive or interface 614 to read from and write to one or more portable computer readable storage media 626. Application programs 611 on computing system 500 can be stored on one or more of the portable computer readable storage media 626, read via the respective R/W drive or interface 614 and loaded into the respective computer readable storage media 608.

Computing system 500 can also include a network adapter or interface 616, such as a TCP/IP adapter card or wireless communication adapter. Application programs 611 on computing system 500 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing system 500 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
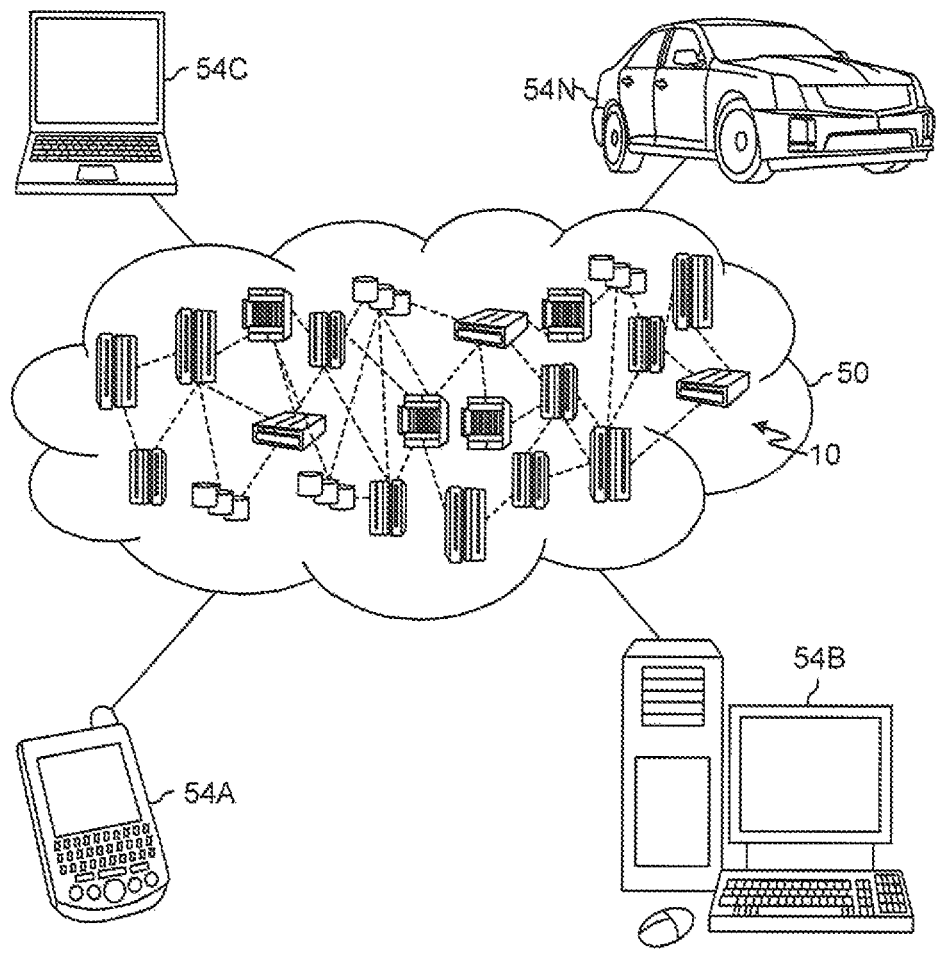
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
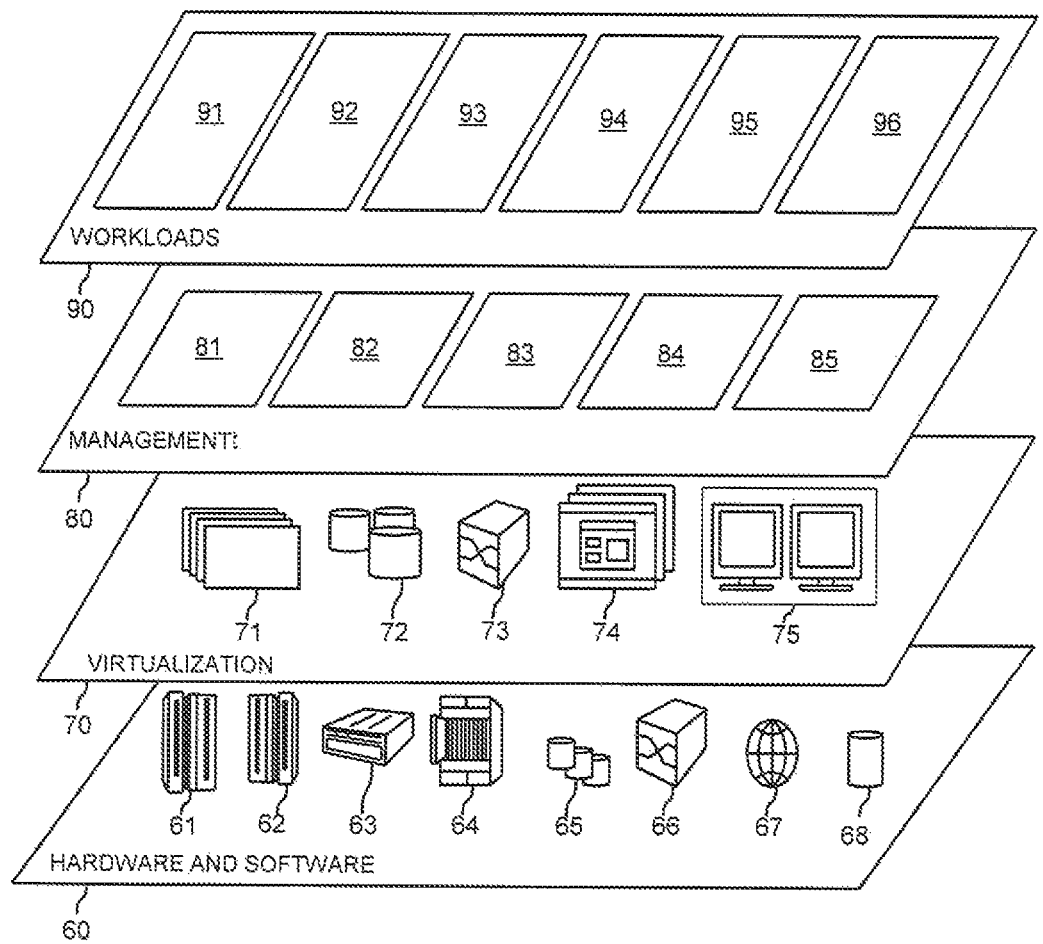
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimization of a number of robots for carrying out tasks at a system 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for optimizing a number of robots for operation of a process at a target system, comprising:
   providing a plurality of available robots to carry out tasks in the process at the target system, wherein the target system includes one or more processors having a processor utilization;
   monitoring the target system by carrying out the process or part of the process with a varying number of robots to determine the processor utilization whilst the robots are executing a varying number of tasks;
   balancing process constraints of the execution of the process with physical system constraints of the target system including available physical robot interfaces by measuring a relationship between a number of tasks at a transactional level and the processor utilization to optimize a number of robots for the process or part of the process at the target system; and
   outputting the optimized number of robots to be allocated for the process or part of the process.

2. The method as claimed in claim 1, wherein the process constraints are based on a speed latency of execution of the process determined from the relationship between a number of tasks and the processor utilization, wherein speed latency is limited by a duration of a part of the process that is not reduced by additional robots.

3. The method as claimed in claim 2, wherein determining a speed latency of the $$S_{latency} = \frac{1}{(1-p) + \frac{p}{s}},$$

execution of the process is based on Amdhal's Law of where s is the speedup of a part of the process that benefits from additional robots and p is the proportion of execution time of the process that benefits from additional robots.

4. The method as claimed in claim 2, wherein determining a speed latency of the execution of the process determines an upper limit on the number of robots and balancing the physical system constraints is based on a knee of a curve of the measured relationship between a number of tasks at a transactional level and the processor utilization within the upper limit.

5. The method as claimed in claim 1, wherein the physical system constraints are based on available physical robot interfaces of the target system that are variable during execution of the process.

6. The method as claimed in claim 1, wherein the physical system constraints are based on determining a knee of a curve of the measured relationship between the number of tasks at a transactional level and the processor utilization to determine a point at which an optimal number of tasks is reached for the processor utilization.

7. The method as claimed in claim 1, wherein monitoring the target system over a time period is carried out for a training period and the target system learns an optimized number of robots for the target system under known conditions.

8. The method as claimed in claim 1, wherein outputting an optimized number of robots for the process dynamically varies during the execution of the process.

9. The method as claimed in claim 8, including monitoring the target system during execution of the process to determine a total processor utilization whilst the robots are executing the tasks including processing carried out for interactions in addition to the robots and updating the optimized number of robots during execution of the process.

10. The method as claimed in claim 1, wherein the process is a finite process or an ongoing process in which a plurality of tasks is required to be performed and the target system is a legacy system with established physical constraints.

11. The method as claimed in claim 1, wherein a number of robots includes a non-integer number of robots.

12. A system for optimizing a number of robots for operation of a process at a target system, the system comprising: a computer system comprising, a processor, a computer readable storage medium, and program instructions stored on the computer readable storage medium, said computer readable storage medium not being a transitory propagating signal, said program instructions being executable by the processor to cause the computer system to:
provide a plurality of available robots to carry out tasks in the process at a target system, wherein the target system includes one or more processors having a processor utilization;
monitor the target system by carrying out the process or part of the process with a varying number of robots to determine the processor utilization whilst the robots are executing a varying number of tasks;
balance process constraints of the execution of the process with physical system constraints of the target system including available physical robot interfaces by measuring a relationship between a number of tasks at a transactional level and the processor utilization to optimize a number of robots for the process or part of the process at the target system; and
output the optimized number of robots to be allocated for the process or part of the process.

13. The system as claimed in claim 12, wherein the process constraints are based on a speed latency of execution of the process determined from the relationship between a number of tasks at a transactional level and the processor utilization, wherein speed latency is limited by a duration of a part of the process that is not reduced by additional robots.

14. The system as claimed in claim 12, wherein the physical system constraints are based on determining a knee of a curve of the measured relationship between the number of tasks at a transactional level and the processor utilization to determine a point at which an optimal number of tasks is reached for the processor utilization.

15. The system as claimed in claim 13, wherein determining a speed latency of the execution of the process determines an upper limit on the number of robots and balances the physical system constraints by analyzing a knee of a curve of the measured relationship between a number of tasks at a transactional level and the processor utilization within the upper limit.

16. The system as claimed in claim 12, wherein the physical system constraints are based on available physical robot interfaces of the target system that are variable during execution of the process.

17. The system as claimed in claim 12, wherein monitoring the target system over a time period is carried out for a training period.

18. The system as claimed in claim 12, wherein monitoring the target system over a time period is carried out for learning an optimized number of robots for the target system under known conditions.

19. The system as claimed in claim 12, wherein monitoring the target system during execution of the process to determine a total processor utilization whilst the robots are executing the tasks further comprises processing carried out for interactions in addition to the robots and updating the optimized number of robots during execution of the process.

20. A computer program product for optimizing a number of robots for operation of a process at a target system, the computer program product comprising a computer readable storage medium having program instructions embodied therewith, said computer readable storage medium not being a transitory propagating signal, said program instructions executable by a processor to cause the processor to:
provide a plurality of available robots to carry out tasks in the process at the target system, wherein the target system includes one or more processors having a processor utilization;
monitor the target system by carrying out the process or part of the process with a varying number of robots to determine a processor utilization whilst the robots are executing a varying number of tasks;
balance process constraints of the execution of the process with physical system constraints of the target system including available physical robot interfaces by measuring a relationship between a number of tasks at a transactional level and the processor utilization to optimize a number of robots for the process or part of the process at the target system; and
output the optimized number of robots to be allocated for the process or part of the process.

\* \* \* \* \*